United States Patent [19]

Fehr

[11] 4,453,591

[45] Jun. 12, 1984

[54] AIR-CONDITIONING APPARATUS FOR MOTOR VEHICLES

[75] Inventor: Werner Fehr, Steinheim, Fed. Rep. of Germany

[73] Assignee: Süddeutsche Kühlerfabrik Julius Fr. Behr GmbH & Co. KG, Stuttgart, Fed. Rep. of Germany

[21] Appl. No.: 255,260

[22] Filed: Apr. 17, 1981

[30] Foreign Application Priority Data

Apr. 30, 1980 [DE] Fed. Rep. of Germany ....... 3016679

[51] Int. Cl.³ .......................... B60H 3/00; F25B 29/00; F24F 3/14
[52] U.S. Cl. .......................... 165/42; 165/16; 165/21; 165/23; 165/35; 165/65; 62/176.1; 98/2.01; 236/13; 236/44 R
[58] Field of Search .......... 165/41, 42, 43, 23; 62/176, 90; 98/2, 2.01, 2.02, 2.03, 2.04, 2.05, 2.06, 2.07, 2.08, 2.09, 2.1, 2.11, 2.12, 2.13, 2.14, 2.18, 2.19; 251/61.5

[56] References Cited

U.S. PATENT DOCUMENTS

| 843,909 | 2/1907 | Peters et al. ........................ 236/13 |
| 2,161,312 | 6/1939 | Pritchard ........................ 62/176 E |
| 2,909,323 | 10/1959 | Cholvin et al. ........................ 236/13 |
| 3,656,541 | 3/1972 | Coyle et al. ........................ 165/16 |
| 3,802,490 | 4/1974 | Jacobs ........................ 165/23 |
| 3,809,151 | 5/1974 | Scheidel ........................ 165/42 |
| 3,845,700 | 11/1974 | Lefeuvre ........................ 98/2 |
| 3,948,312 | 4/1976 | Nisbet ........................ 165/42 |
| 3,983,930 | 10/1976 | Franz ........................ 165/42 |
| 4,072,186 | 2/1978 | Barton ........................ 165/43 |
| 4,125,150 | 11/1978 | Zelger et al. ........................ 165/42 |
| 4,163,543 | 8/1979 | Cook ........................ 251/61.5 |
| 4,193,339 | 3/1980 | Giles ........................ 98/2.14 |
| 4,346,648 | 8/1982 | Chatlos ........................ 98/2.12 |

FOREIGN PATENT DOCUMENTS

| 1916640 | 10/1970 | Fed. Rep. of Germany . |
| 1655121 | 6/1971 | Fed. Rep. of Germany . |
| 2423188 | 12/1975 | Fed. Rep. of Germany . |
| 2654552 | 2/1976 | Fed. Rep. of Germany ....... 98/2.06 |
| 1941356 | 9/1978 | Fed. Rep. of Germany ........ 165/43 |
| 0562075 | 2/1923 | France ........................ 62/90 |
| 54-31469 | 10/1979 | Japan ........................ 165/16 |
| 54-31468 | 10/1979 | Japan ........................ 165/16 |
| 55-94810 | 7/1980 | Japan ........................ 62/186 |
| 1444950 | 4/1976 | United Kingdom .................. 165/42 |
| 1508908 | 4/1978 | United Kingdom . |
| 1539902 | 2/1979 | United Kingdom . |

Primary Examiner—William R. Cline
Assistant Examiner—Edward P. Walker
Attorney, Agent, or Firm—Barnes & Thornburg

[57] ABSTRACT

Air conditioning apparatus for conditioning the air supplied to a vehicle passenger space is provided which includes an air conditioning air cooling evaporator and an air heater unit arranged in series. An evaporator bypass duct extends in bypassing relationship to the evaporator and a heater bypass duct extends in bypassing relationship to the heater. To control the temperature of the air conditioned by the apparatus two temperature mixing air flaps are provided, one air flap controlling the proportion of air flow through the evaporator and its bypass duct and the other air flap controlling the proportion of air through the heater and its bypass duct.

34 Claims, 4 Drawing Figures

AIR-CONDITIONING APPARATUS FOR MOTOR VEHICLES

BACKGROUND AND SUMMARY OF THE INVENTION

The invention is concerned with a ventilating, heating and/or air-conditioning apparatus for motor vehicles. This apparatus includes a fan located in a housing, a vaporizer for a cooling system, an afterheater or heating-system heat exchanger, a temperature-mixing air flap to steer the air flow to the after-heater, and connections for the admission of fresh air or recirculated air. Connections are also provided for the discharging of air into the passenger area, e.g., to the windshield, the defroster vent, the area occupied by the passenger's feet, etc.

A motor vehicle air-conditioning apparatus, of the type described above, is known from DE-OS No. 24 23 188, for example. In that prior art known apparatus, however, the fan is located in the flow path beyond the evaporator and/or after-heater in an arrangement including suction means, which produces disturbing fan noises in the inner space of the vehicle. In another known air-conditioning apparatus for motor vehicles (U.S. Pat. No. 3,809,151) including at least one heat exchanger serving as a cooling element and another serving as a heating element and located in a series connected air-duct system, through which air is conducted to the inner space of the vehicle, the temperature in the vehicle is influenced by a vane assembly. This assembly mixes the air flowing through three parallel air ducts in an appropriate manner. The air is preferably heated in one air duct and cooled in the second air duct, while the temperature of the air flowing through the third air duct is unchanged.

In an air-conditioning apparatus of the kind just described above, two streams of air, at the most, are always mixed with each other; one of those streams is the stream of air the temperature of which corresponds to that of the outside air.

Providing a by-pass for the fresh air, which encircles the heating-system heat exchanger, is also known (DE-AS No. 16 55 121) in a heating and ventilating apparatus for a motor vehicle. In that apparatus at least one control flap to steer the quantity of fresh air flowing through the by-pass is provided and the by-pass stream of air strikes the stream of air conducted through the heating element almost at right angles. No evaporator is provided in this known apparatus.

However, passenger-space air-conditioning apparatuses are also known (U.S. Pat. No. 4,072,186) in which cooled air from the evaporator can be conducted to the passenger space over a mixing flap after subjection to a heating element. In such apparatus, conducting of moist air from the evaporator to the passenger space, the air being first dehumidified and then heated by the heating element (reheat system) is made possible.

Other heating, ventilating and/or air-conditioning apparatuses of various kinds of design, as well as components of such systems, are known from U.S. Pat. No. 3,948,312, British Pat. No. 1,508,908 and British Pat. No. 1,539,902.

In accordance with the known state of the art, the adjusting and controlling of air-conditioning apparatuses for motor vehicles is accomplished to permit varying amounts of air to flow through their afterheaters. The evaporator is adjusted by a simple two-point adjustment of the evaporator fin surface temperature by turning the compressor drive on or off and the afterheater is adjusted by constant adjustment of the afterheater output with constant adjustment of air-mixing flaps. In such apparatus, frequent variation in temperature of the air beyond the evaporator results from turning the compressor on and off and causes varying disturbance on the subsequent section of the afterheater, which is constantly being adjusted and is thus stimulated to oscillate. This oscillation phenomenon is especially critical where there is a slight afterheating output, only a small amount of air flows through the afterheater and the temperature amplitude of the heated air remains practically undamped.

The temperature variations in the air exhausts of 4°–5° K. are passed on, up to approximately 50%, to the inside air and are detected by a sensitive NTC resistance thermometer which measures the temperature of the inside air. That resistance reading logically results in a frequent readjustment of the afterheater.

The known air-conditioning apparatuses also have generally unfavorably-designed secondary-air flaps, which are required in the partial-load area to mix a small amount of air, which is heated to approximately 85° C., with a relatively large amount of air which is conducted past the heat exchanger and is at about 5° C., for example. As a result, considerable differences in air temperature appear at the vents of the air-conditioning apparatus, even inside an air exhaust. Tension symptoms and discomfort of passengers are intensified if the speed of motor vehicle travel is increased; specifically, the atmospheric pressure at the air intake in front of the windshield increases and the amount of air passing through the interior of the vehicle rises to a multiple of the desired amount.

A vertical temperature variation occurs in the interior vehicle space, in connection with air-conditioning apparatuses characterized by higher temperatures existing at passenger breast heights and lower temperatures at the passenger head elevations. This frequently causes tension symptoms in passengers which result from unduly low temperatures at the head level of the passenger resulting from an unduly high velocity of air flow through the interior of the vehicle.

An object of the present invention is to create a downstream controlling or regulating system including provision of adjustable temperature gradients for the air exhausts and an adjustable degree of dehumidification for the air contacting the vaporizer in a ventilating, heating or air-conditioning apparatus. In such a system, all air discharge temperatures, in particular, are to be maintained uniform and the amount of air flowing through the system is to be kept nearly constant, independent of the speed of travel of the vehicle or the speed of the air blown by the fan.

Essentially, this object is accomplished by the invention by providing the evaporator with a fixed air deflector constituting an outlet duct and a by-pass duct and providing a movable first temperature-mixing air flap with a movable air-volume-regulating flap. These flaps are moved between a limiting position closing off the evaporator outlet and a limiting position closing off the by-pass duct. An afterheater is provided with a fixed air deflector on the approach-flow side and a deflector of the downflow side to constitute an intake duct, an outlet duct and a by-pass duct. A movable second temperature-mixing air flap is provided with a limiting position closing off the intake duct into the afterheater and a limiting position closing off the by-pass duct. Thus the evaporator and afterheater, downstream, either in their cooling or afterheating air output, are adapted to be controlled either independently of each other or in a definite preselected functional linkage with one another.

It is especially advantageous that, in accordance with another feature of the invention, each temperature-mixing air flap is hinged to the lower end of the evaporator or afterheater.

In a preferred embodiment of the invention, the flow cross sections of the by-pass ducts have dimensions which are the same as those of the hot-air and cold-air ducts functioning as diffusers by the action of air deflectors which are associated with them.

In an advantageous further development of the invention, the air deflectors constitute a duct assembly which conveys cold air and leads directly to a discharge area constituting middle vents and lateral vents in the car interior.

In still another development, it is advantageous that an air flap be provided to control the amount of cold air flowing through the discharge outlet for cooled air (air-conditioning outlets).

In a further development of the invention, it is advantageous that the air-volume-regulating flap be adapted to swivel between the air deflector and the wall of the housing and have a shape which conforms to the housing wall, which is located in that area.

In particular, it is advantageous that the air-volume-regulating flap have a means of controlling the electric voltage for the fan which depends upon the angle of rotation of the air-volume-regulating flap.

A preferred embodiment of the invention is characterized in that the air deflector and the by-pass duct to the evaporator, on the one hand, and the air deflector and the by-pass duct to the afterheater, on the other, are arranged so that the cold air strikes the warmer air from the by-pass duct to the evaporator at right angles beyond the evaporator (from the cold-air duct). Moreover, the hot air of the hot-air duct should strike the colder air flowing through the by-pass duct to the afterheater at right angles beyond the afterheater.

To make the air temperature at the individual discharges uniform, it is advantageous if a rerouting section is provided beyond the hot-air duct or the by-pass duct to the afterheater and an air mixing area is provided therebeyond.

For that purpose, it is also advantageous to locate the air discharges for the area occupied by the passengers' feet, the defroster, the middle vents and the lateral vents in an arrangement, one after the other beyond the air mixing area, in accordance with the desired temperature gradients.

An advantageous method of constructing the temperature-mixing air flaps, from the point of view of operational techniques, results when the air deflectors have lateral parts which run in a tapering direction with respect to the air deflectors, from the points where they are fastened to the heat exchangers, and the hoods formed in that way are separated laterally from the housing wall.

It is especially advantageous for the temperature-mixing flaps to be fitted to the trapezoidal intake and outlet cross sections of the hoods, which are formed, and thus have no sealing function to perform with respect to the housing wall, so that a torsional moment which is as small as possible is ensured.

An apparatus constructed in accordance with the invention is characterized in that the air temperature variations, as a result of two-point adjustments of the compressor of approximately 4°–5° K. at the air exhausts in the partial-load area of the air-conditioning operation, which are caused by the temperature-mixing air flap at the vaporizer, are cut approximately in half. The air deflectors, which are located after the heat exchangers evaporator and afterheater), cause the volume of air from the evaporator and the afterheater to strike the volume of air being conveyed in either by-pass approximately at right angles in the partial-load area. As a result, an optimal mixing of those two volumes of air is achieved.

Since the flow cross sections of each by-pass duct are equal to or, at a maximum, 10% smaller in size than the flow cross sections between the corresponding heat exchangers (air exhaust sides) and air deflectors that are associated with them, the quantity of air flowing through each heat exchanger (evaporator or afterheater) in the intermediate position of the temperature-mixing air flaps is made approximately equal in volume to the quantity of air which flows through the corresponding by-pass. As a result, a linearization of the characteristic curve for the temperature-mixing air flap is obtained, at least in the middle range.

The duct having the air deflectors on the downflow side of the evaporator and on the approach-flow side to the afterheater, which leads directly to the air-conditioning exhausts, makes it possible for an adjustable volume of cold air flow in the channel, depending upon the position of an air flap which is attached to that duct. Thus the air emerging at the air-conditioning exhausts can be altered in temperature from quite cold to the temperature of the other exhausts.

The drop in pressure is kept as small as possible by the passages for conveying air, which are built in accordance with the invention, and also by the air deflectors.

Because of the special way the deflectors and temperature-mixing air flaps are constructed, the latter do not have any sealing functions to perform with respect to the lateral walls of the housing and the torsional moment is minimal and almost equally large for all temperature-mixing air flaps.

In another embodiment, which is a further development of the invention, it is advantageous to have means for controlling the automatic adjustment of the air-volume-regulating flap, which means are dependent upon the atmospheric pressure and also dependent upon the speed of vehicle travel, so that the rate of air flow remains nearly constant.

It is also advantageous to include means for controlling the continuous adjustment of the first temperature-mixing air flap, depending upon the temperature of the outside air, the temperature of the air inside and the humidity of the air to be provided which, by means of a regulating device, makes constant adjustability possible.

Furthermore, it is advantageous to include means for controlling the adjustment of the degree of dehumidification and cooling of the volumes of outside air passing through the ducts. Desired values for a vaporization temperature regulator or a vaporization pressure regulator and/or the electric voltage for the fan should also be adjustably controlled.

It is desirable for the evaporator pressure regulator or evaporator temperature regulator to be functionally linked to the first temperature-mixing air flap in such a way that the desired value of that regulator is constantly set higher as the air volume through the evaporator decreases. Also, the compressor should be switched off in a known manner by using a magneto coupling when a maximum value of air flow through the evaporator is reached. The compressor should be correspondingly switched on when this air flow is reduced below a predetermined value.

It is advantageous for the temperature-mixing air flap of the afterheater to be adjusted automatically in conformity with the temperature of the outside air and the temperature of the inside air and to be coupled functionally with the drive mechanism for the temperature-mixing air flap of the evaporator in such a way that an adjustment takes place. However, a desired value for the degree of dehumidification and cooling is accomplished by an adjustment only of the temperature-mixing air flap of the evaporator.

It is advantageous for the individual air discharges to be provided with air valves, which are activated by motors, especially for the space occupied by the passengers' feet. The lateral vents can be adjusted separately, in at least two stages, for each side of the vehicle, and in that way make it possible to admit different amounts of air on the driver's side and on the opposite side.

Finally, it is desirable, in another further development of the invention, for the air-conditioning apparatus to include a control device for remotely controlling the vanes which are either controllable individually or are functionally linked for manual control. This device is particularly useful for setting the desired values for the quantity of air, the inside temperature of the air and the degree of dehumidification of the air, which is admitted into the vehicle.

It is desirable for the air valves activated by motors to be linearly-displaceable poppet valves. Pneumatic servomotors (vacuum adjustment boxes), with their activating rods being connected flexibly with the poppet valves, can provide the driving force for the mechanism.

Such poppet valves are familiar in connection with cold-water and hot-water circuits (DE-AS No. 19 16 640).

Additional details concerning and advantages of the invention are described more fully in conjunction with the embodiments, which are represented schematically in the drawings.

DETAILED DESCRIPTION OF THE PREFERRED EMBODIMENT

Figure 1:
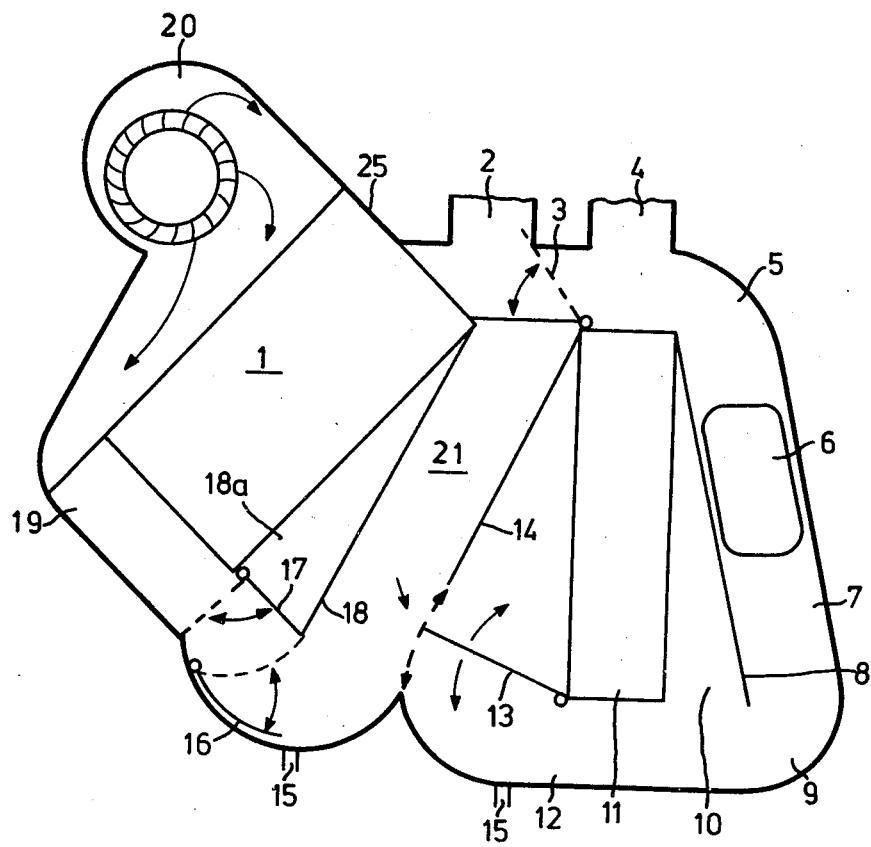
FIG. 1 shows a schematic cross section through an air-conditioning apparatus which is constructed in accordance with the invention.

In the air-conditioning element of the air-conditioning apparatus of the invention, which is shown schematically in cross section in FIG. 1, a fan 20 is located in a housing 25 which is driven by an electric motor, that is variable in at least two stages or the rotation rate of which is constant. The fan 20 sucks in air from a duct (not shown) delivering outside air and/or recirculated air, in which the respective proportions of outside air and recirculated air can be adjusted by appropriate vanes. The fan first pushes that air through an evaporator 1 of an air-conditioning apparatus which, as is conventional, includes a condenser 41, a compressor 26 with a magneto coupling 28 and an evaporator pressure regulator or evaporator temperature regulator 27 (cf. FIG. 4). In addition to the evaporator 1, a by-pass duct 19 and a fixed air deflector 18, which leads to the bottom side of the evaporator 1, are located in the downflow side of the evaporator 1. A temperature-mixing air flap 17 for the evaporator 1 is hinged to the lower end of the vaporizer 1, and closes off the cold-air duct 18a formed by the air deflector 18, in one of its limiting positions, and closes off the by-pass duct 19, in its other limiting position.

Looking in the direction of the flow of air, a second fixed air deflector 14 is located on the approach-flow side of an afterheater or heating-system heat exchanger 11. The space between the two air deflectors 14 and 18 constitute a cold-air duct 21, which conducts untempered air to an air-conditioning discharge 2. A movable adjusting flap 3, serves the purpose of adjusting the volume of air for the air-conditioning discharge system.

Underneath the cold-air duct 21, at the end of the by-pass 19, the housing is curved for the purpose of attaining better rerouting and better drainage, and is provided with a fitted air-volume-regulating flap 16. This air-volume-regulating flap 16 serves the purpose of adjusting the volume of air and keeping it constant. At least one drain 15 for water is provided at the lowest point of the housing 25.

A second temperature-mixing air flap 13 controls the flow of air coming from the evaporator 1 and/or the by-pass 19 to the approach-flow side of the afterheater 11. The temperature-mixing air flap 13 is hinged to the lower end of the afterheater 11 and is adapted to being moved between one limiting position, in which all the air flow is delivered to the afterheater 11, and a limiting position in which all the air is conveyed past the afterheater 11 by a by-pass duct 12.

On the downflow side of the afterheater 11, a fixed air deflector 8 is located, which is carried to the bottomside of the afterheater. The by-pass ducts 19 and 12 and the air deflector 18, at the evaporator 1 on the downflow side, and the air deflector 8, at the afterheater 11 on the downflow side, are designed in such a way that the air flowing through the heat exchangers (evaporator 1 and afterheater 11) strikes the air flowing through the by-pass duct 19 or 12 at right angles, so that in each area a first mixing area and a second mixing area are provided. Following the second mixing area, beyond the afterheater 11, the housing is provided with a rerouting section 9 for further mixing of the air. Between the housing wall 25 and the air deflector 8, which run parallel with each other for reasons of flow technology, an aftermixing area 7 is formed in which a process of rendering uniform the variously tempered quantities of air, from the afterheater 11 and the by-pass duct 12, takes place. Further downstream air discharges 6 for the area occupied by the passengers' feet and air discharges 4 for the defroster are located in the housing 25. There, the air deflector 8 forms a distribution duct 5 in combination with the wall 25 of the housing.

The air-conditioning apparatus described above works as follows:

The fan 20 conveys a specific quantity of air, through the evaporator 1 and the by-pass duct 19 in the partial-load area. the volume of air is divided up approximately linearly, according to the geometric arrangement and dimensioning of the cross sections of the evaporator 1, the temperature-mixing air flap 17 and the by-pass duct 19. The mixing of the cooled quantity of air, which has flowed through the evaporator 1, with the uncooled quantity of air, which passes through the by-pass duct 19, is accomplished by the air deflector 18, working together with the temperature-mixing air flap 17 and the by-pass duct 19. The total air volume, which is kept nearly constant by the air-volume-regulating flap 16, is subsequently rerouted. Thus, the intake air (outside air and recirculated air), which is sucked in, is dehumidified, cooled and mixed with the intake air again, depending upon the position of the temperature-mixing air flap 17. The temperature-altered mixed air goes partly into the afterheater 11 and partly into the by-pass duct 12 that is associated with it, depending upon the position of the second temperature-mixing air flap 13. The air deflector 8, which is on the downflow side, forces the two quantities of air to meet at right angles to each other, which results in another mixing process which is completed by the rerouting section 9 in conjunction with a straight section 7 which follows it. There the air discharges for the area occupied by the passengers' feet 6, the defroster 4 and the air-conditioning vents 2 in an arrangement one after the other, in accordance with the cooling gradients. The air enters the inside of the vehicle at nearly the same temperature at each location.

If a lower temperature is desired at the air-conditioning discharges 2, that can be obtained by means of the adjusting flap 3, which makes it possible to set any desired lower temperature. In the limiting position (represented with a broken line in the drawing), the air emerges at the air-conditioning discharges 2 at the temperature it attains after it has passed the evaporator 1.

To increase passenger comfort with a view to providing a pleasant ride, an air-volume-regulating flap 16 is included. It can be controlled, depending upon the speed of the fan (or the speed of vehicle travel), which can be determined by a sensing element 37 (cf. FIG. 4), so that the total rate of air flow remains nearly constant.

Figure 2:
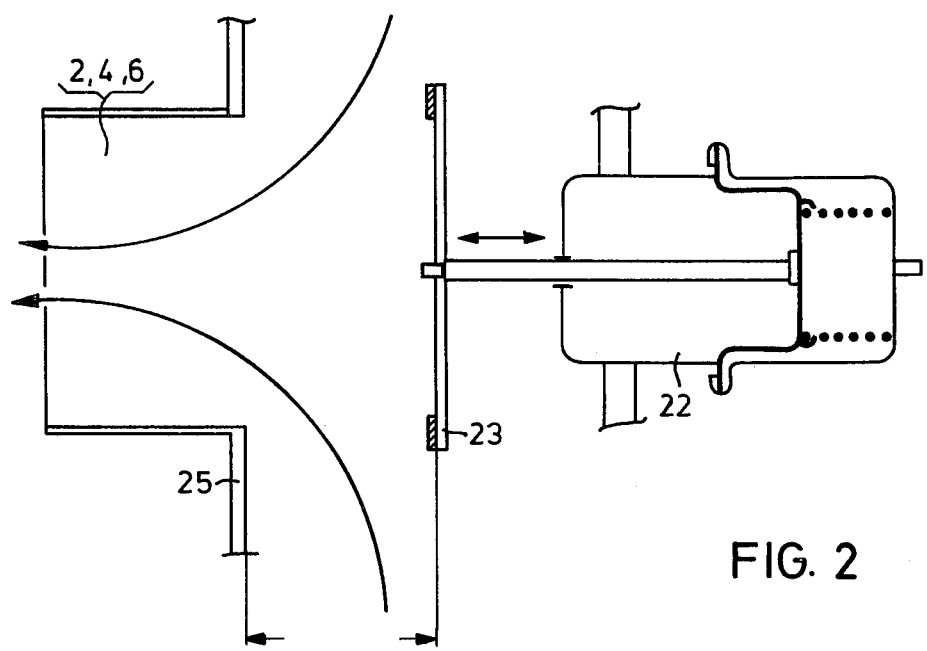
FIG. 2 shows details of an air valve element.

The air discharges 2, 4, 6 on the housing 25 are mostly controlled in one or two stages. It is advantageous for this to be accomplished by poppet valves 23 in the way which is shown in FIG. 2. These poppet valves 23 are moved linearly by servomotors, and those servomotors can be vacuum adjustment boxes 22, for example, which are connected to a vacuum source in the motor vehicle. The use of flat valve disks has the advantage that the air can circulate around it without a substantial drop in pressure when the valve disks are open, and thus the air can pass to the next discharge area unhindered. On the other hand, an open air flap would narrow down the main duct.

Figure 3:
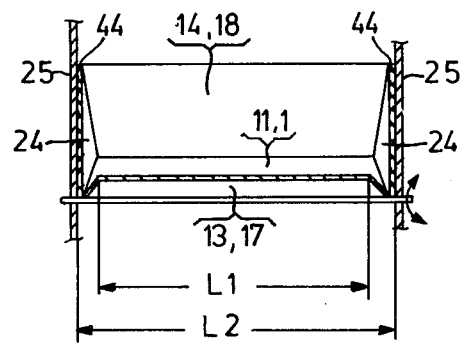
FIG. 3 shows a schematic representation of the construction of the housing in the area of the air deflectors and the temperature-mixing air flaps.

A detailed showing of the temperature-mixing air flaps 13 and 17 and the air deflectors 14, 18 may be seen in FIG. 3. In order that the temperature-mixing air flaps 13 and 17, for the afterheater 11 and for the evaporator 1, will require as little energy as possible for adjustment with respect to a servoactuation, the two side walls 24 of the air deflectors 14 and 18 are arranged in a tapering direction with respect to the housing wall 25. Thus the temperature-mixing air flaps 13 and 17 perform no sealing function on their circumferences, but only on the narrow surfaces where they touch the air deflectors 14 and 18 and the triangular side walls 24. The evaporator 1 and the afterheater 11 are conventionally provided with sealing agents where their narrow sides encounter the housing wall 25.

Figure 4:
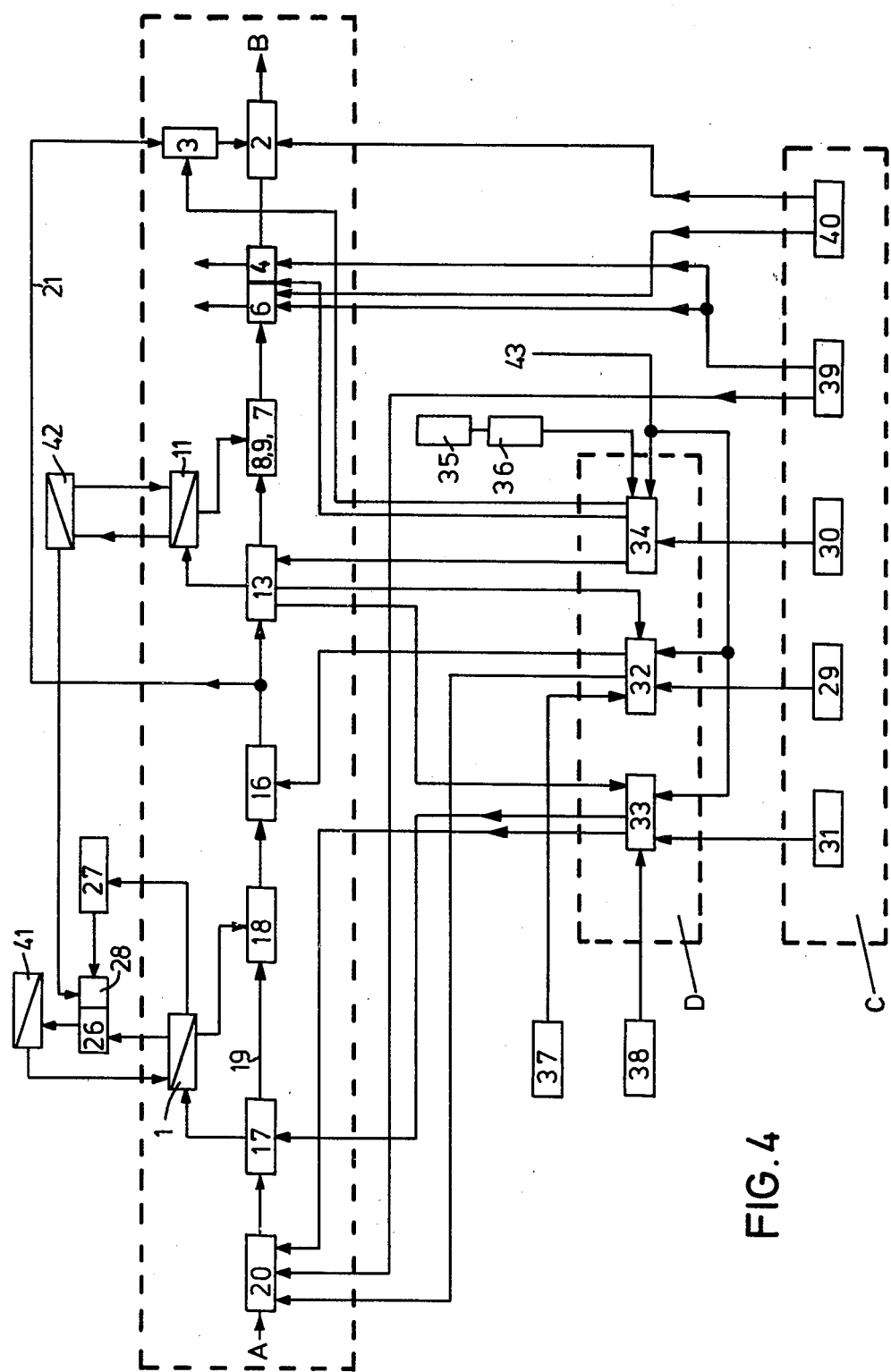
FIG. 4 is a diagram showing the functioning of an air-conditioning apparatus (A to B) provided with a control switch (C), an adjustment and control element (D) and corresponding parts of the motor vehicle.

FIG. 4 shows a complete air-conditioning apparatus in which the treatment of the air on the way from point A to point B, as in the air-conditioning device of FIG. 1, takes place in the area marked by broken lines.

It can also be seen from FIG. 4 that the compressor 26 can be driven by the internal-combustion engine 42 through a magneto coupling 28. The afterheater 11 is included as a secondary circuit in the cooling-medium circuit of the internal-combustion engine 42 in a conventional manner.

The compressor 26 is controlled by an evaporator pressure regulator 27 or an evaporator fin surface temperature regulator (evaporator temperature regulator) through the magneto coupling 28 in a conventional manner.

Controlling and adjusting the apparatus is accomplished by means of a regulator 32 for the air volume, which controls the air-volume regulating flap 16 and the fan 20. The regulator itself receives signals from an air-volume sensing element 37, an atomspheric pressure indicator or tachosignal converter, for example, and an adjustment signal from the temperature-mixing air flap 13. The desired-value setting of the air volume is accomplished through a hand-operated positioning device 29. Furthermore, a desired-value control 30 for the inside-space temperature is provided at the control switch, which acts upon the second temperature-mixing air flap 13 through a regulator 34. The regulator 34 also emits signals for controlling the air valves for the area occupied by the passengers' feet 6 and the defroster 4. Furthermore, the regulator 34 can act upon the adjustment flap 3, which controls the temperature of the air for the air-conditioning discharges 2. The control process is adapted to the temperature conditions, at any one time, by means of an outside-temperature sensing element 35 and an inside temperature sensing element 36. Auxiliary power for the regulators is delivered at 43 by the motor vehicle's powersupply installation. Vacuum also serves as auxiliary power.

Finally, another desired-value positioning device 31 is supplied for dehumidification, and it controls the degree of dehumidification and cooling by a regulator 33. That regulator 33 is influenced by a humidity sensing element 38 and, on the other hand, by the position of the second temperature-mixing air flap 13. The function of the humidity sensing element 38 could be assumed partially by the positioning of the windshield wiper switch since an increasing intensification of dehumidification is necessary, as a rule, as it is switched on step by step. The regulator 33 controls the position of the first temperature-mixing air flap 17 and also controls the fan 20, when appropriate. A "defroster" switch 39 is also included in the control unit; both the discharge 6 for the area occupied by the passengers' feet and the discharge 4 for the defroster air volume, and, on the other side, the fan 20, all, are controlled by it. Finally, still another switch, the "bi-level" switch 40, is provided. It serves the purpose of controlling the valves at the air-conditioning discharges and the discharges in the area occupied by the passengers' feet.

The desired value of the vaporizer pressure regulator 27 is set in such a way, depending upon the position of the first temperature-mixing air flap 17, that when little cooling output is required a constantly higher desired value is set. In the case where maximum cooling output is desired, the lowest possible (because of the possibility of freezing) value, but one which is not to be exceeded on the down side, is set. In that process, the coupling can be made mechanically, electrically or electromechanically.

The invention is not limited to the embodiments which have been represented and described above nor to the corresponding components, but it also includes all expert modifications and further developments and partial combinations or subcombinations of the features and steps which have been described and/or depicted within the scope of the invention.

What is claimed is:

1. Air conditioning apparatus for conditioning the air supplied to a vehicle passenger space and the like, comprising:

air inlet means;
   an evaporator arranged downstream of the air inlet means and including means for cooling air passed therethrough;
   evaporator inlet means supplying air from the air inlet means to the evaporator;
   evaporator bypass duct means for conducting air from the air inlet means to a location downstream of the evaporator in bypassing relationship to the evaporator;
   evaporator outlet guide means for guiding the flow of air away from the evaporator after it has been cooled therein, said evaporator outlet guide means including first deflector plate means for guiding air from the evaporator to the outlet of the evaporator bypass duct means;
   first temperature mixing valve means for controlling the proportion of air supplied from the air inlet means to the respective evaporator and evaporator bypass duct means;
   a heat exchanger arranged downstream of the evaporator and evaporator bypass duct means and including means for heating air passed therethrough;
   heat exchangers inlet duct means for guiding air from the evaporator and the evaporator bypass duct means to the heat exchanger;
   heat exchanger bypass duct means for conducting air from the evaporator and evaporator bypass duct means to a location downstream of the heat exchanger in bypassing relationship to the heat exchanger;
   heat exchanger outlet guide means for guiding the flow of air away from the heat exchanger after it has been heated therein to a location where it is mixed with the air from the heat exchanger bypass duct means, said heat exchanger outlet guide means including second deflector plate means; and
   second temperature mixing valve means for controlling the proportion of air supplied from the evaporator and evaporator bypass duct means to the respective heat exchanger and heat exchanger bypass duct means;
   wherein said heat exchanger inlet duct means includes a third deflector plate means and wherein the respective sides of the first and third deflector plate means facing respectively away from the evaporator and heat exchanger form a cool air duct for directing air to the vehicle passenger space in bypassing relationship to both the heat exchanger and the heat exchanger bypass duct means.

2. Apparatus according to claim 1, wherein the first temperature mixing valve means includes a movable first valve flap member, said first valve flap member being selectively movable between an evaporator outlet closing position and an evaporator bypass duct means outlet closing position.

3. Apparatus according to claim 2, wherein the first valve flap member is hingedly connected at the downstream end of the evaporator.

4. Apparatus according to claim 2, wherein the second temperature mixing valve means includes a movable second valve flap member, said second valve flap member being selectively movable between a heat exchanger inlet duct means closing position and a heat exchanger bypass duct means closing position.

5. Apparatus according to claim 4, wherein said first deflector plate means is a fixed plate disposed to deflect the evaporator outlet air toward the first temperature mixing valve means.

6. Apparatus according to claim 5, wherein said second deflector plate means is a fixed plate disposed to deflect the heat exchanger outlet air toward the outlet of the heat exchanger bypass duct means.

7. Apparatus according to claim 5, wherein the first valve flap member is hingedly connected at the deflector plate means when in said evaporator outlet closing position, wherein the third deflector plate means is a fixed plate provided at the upstream side of the heat exchanger to guide air into the heat exchanger and wherein the second valve flap member is hingedly connected to the upstream end of the heat exchanger and engages said third deflector plate means when in said heat exchanger inlet duct means closing position.

8. Apparatus according to claim 1, wherein the second temperature mixing valve means includes a movable second valve flap member, said second valve flap member being selectively movable between a heat exchanger inlet duct means closing position and a heat exchanger bypass duct means closing position.

9. Apparatus according to claim 8, wherein the second valve flap member is hingedly connected at the upstream end of the heat exchanger.

10. Apparatus according to claim 1, wherein said first deflector plate means is a fixed plate disposed to deflect the evaporator outlet air toward the first temperature mixing valve means.

11. Apparatus according to claim 1, wherein said second deflector plate means is a fixed plate disposed to deflect the heat exchanger outlet air toward the outlet of the heat exchanger bypass duct means.

12. Apparatus according to claim 1, wherein the maximum flow cross section of the evaporator bypass duct means is the same as the maximum flow cross section of the evaporator outlet, and wherein the maximum flow cross section of the heat exchanger bypass duct means is the same as the maximum flow cross section of the heat exchanger outlet.

13. Apparatus according to claim 1, wherein a cold air regulating flap is disposed at the discharge end of the cool air duct for selectively controlling the flow of air from the cool air duct to vents opening into the vehicle passenger space.

14. Apparatus according to claim 1, further comprising an air volume regulating valve means disposed downstream of the evaporator and evaporator bypass duct means and being selectively movable to control the volume of air supplied from the evaporator and evaporator bypass duct means to the heat exchanger and heat exchanger bypass duct means.

15. Apparatus according to claim 14, wherein an air conditioner housing wall forms a part of the evaporator bypass duct means, wherein the air volume regulating valve means includes an air volume regulating flap which is configured to conform to the shape of the adjacent housing wall and is pivotally movable from an open position immediately adjacent said housing wall to a closed position closing off the evaporator bypass duct means and the evaporator outlet.

16. Apparatus according to claim 14, wherein the air inlet means includes an electrically operated fan, and wherein fan control means are provided for controlling the output of the fan in dependance on the position of the air volume regulating valve means.

17. Apparatus according to claim 14, further including means for automatically controlling the selective adjustment of the air volume regulating valve means in dependance upon at least one of the ambient atmospheric pressure and the speed of vehicle travel, in such a way that the rate of air flow remains nearly constant for varying atmospheric pressures and vehicle speeds.

18. Apparatus according to claim 1, wherein the evaporator bypass duct means and the evaporator outlet guide means are configured so that their respective air discharges intersect at approximately right angles in a first mixing space upstream of the heat exchanger and heat exchanger bypass duct means.

19. Apparatus according to claim 18, wherein the heat exchanger bypass duct means and the heat exchanger outlet guide means are configured so that their respective air discharges intersect at approximately right angles in a second mixing space.

20. Apparatus according to claim 1, wherein the heat exchanger bypass duct means and the heat exchanger outlet guide means are configured so that their respective air discharges intersect at approximately right angles in a second mixing space.

21. Apparatus according to claim 1, wherein an air rerouting section is provided downstream of the heat exchanger and heat exchanger bypass duct means, said air rerouting section including means directing the air to outlets leading to the vehicle passenger space.

22. Apparatus according to claim 21, wherein said air rerouting section include air outlets for an area occupied by the vehicle passengers feet, a passenger space windshield defroster area, middle passenger space areas, and lateral passenger space vent areas, said areas being disposed one after the other in accordance with desired temperature gradients within the vehicle passenger space.

23. Apparatus according to claim 1, wherein housing means with a housing wall surrounds the evaporator, heat exchanger and bypass duct means, wherein the outlet guide means includes air deflectors having lateral parts which run in a tapering direction with respect to the air deflectors from points where they are fastened to the respective evaporator and heat exchanger and hoods formed in that way are separated laterally from the housing wall.

24. Apparatus according to claim 23, wherein the temperature mixing valve means include temperature-mixing flaps fitted to the trapezoidal intake and outlet cross sections of the hoods which are formed and thus have no sealing function to perform with respect to the housing wall, so that a torsional moment which is as small as possible is ensured.

25. Apparatus according to claim 1, further including means for controlling the continuous adjustment of the first temperature-mixing valve means in dependance upon at least one of the temperature of outside air, the temperature of the vehicle passenger space air, and the humidity of the air.

26. Apparatus according to claim 25, further including means for controlling the degree of dehumidification and cooling of the quantity of outside air supplied via the air inlet means.

27. Apparatus according to claim 26, further comprising an evaporator temperature regulator, an evaporator pressure regulator, and an electric current supply for a fan of the air inlet means, and wherein means are provided for controlling the desired values of at least one of the evaporator temperature, the evaporator pressure and the electric current supply.

28. Apparatus according to claim 27, wherein linking means are provided for linking the evaporator pressure regulator and evaporator temperature regulator to the first temperature-mixing valve means such that the desired values of said regulators are constantly set higher as the air flow through the evaporator decreases and a compressor is switched off through the action of a magneto coupling when a maximum value of said air flow is reached, and wherein means are provided for switching the compressor on by said magneto coupling when the value of said air flow falls below a predetermined value.

29. Apparatus according to claim 1, wherein control means are provided for automatically adjusting the second temperature mixing valve means in conformity with the temperature of the outside air and the temperature of the air inside, said control means including means operating a drive mechanism for adjusting the first temperature-mixing valve means and the second temperature-mixing valve means in the same direction of opening and closing with the setting of the desired value for the degree of dehumidification and cooling only bringing about an adjustment of the second temperature-mixing valve means.

30. Apparatus according to claim 1, further comprising individual air discharges to the vehicle passenger space with motor-activated air valves which, especially for a space occupied by the passengers' feet and for lateral vents, can be adjusted separately, in at least two stages, for each side of the vehicle, whereby it is possible to admit different amounts of air on the driver's side and the opposite side of the vehicle passenger space.

31. Apparatus according to claim 30, wherein the motor-activated air valves are linearly-displaceable poppet valves, wherein pneumatic servomotors serve as the driving force for these motor activated air valves, with their activating rods being connected flexibly with the poppet valves.

32. Apparatus according to claim 30, further comprising a control device for remotely controlling the individual air discharges by setting the desired values for the quantity of air, the inside temperature and the degree of dehumidification.

33. Apparatus according to claim 32, wherein the motor-activated air valves are linearly-displaceable poppet valves, wherein pneumatic servomotors serve as the driving force for these motor activated air valves, with their activating rods being connected flexibly with the poppet valves.

34. Apparatus according to claim 1, wherein the first and third deflector plate means are respective fixed plates.

* * * * *